(12) United States Patent
Gunda et al.

(10) Patent No.: US 10,445,120 B2
(45) Date of Patent: Oct. 15, 2019

(54) TIERED APPLICATION DISCOVERY

(71) Applicant: Nicira, Inc., Palo Alto, CA (US)

(72) Inventors: Laxmikant Gunda, San Jose, CA (US); Srikanth Manikarnike, Santa Clara, CA (US); Sirisha Myneni, Santa Clara, CA (US)

(73) Assignee: Nicira, Inc., Palo Alto, CA (US)

( * ) Notice: Subject to any disclaimer, the term of this patent is extended or adjusted under 35 U.S.C. 154(b) by 140 days.

(21) Appl. No.: 15/585,329

(22) Filed: May 3, 2017

(65) Prior Publication Data

US 2018/0321961 A1 Nov. 8, 2018

(51) Int. Cl.
*G06F 9/46* (2006.01)
*G06F 9/455* (2018.01)

(52) U.S. Cl.
CPC ...... *G06F 9/45545* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| | | |
|---|---|---|
| 2005/0157654 A1 | 7/2005 | Farrell et al. |
| 2011/0276682 A1 | 11/2011 | Ding et al. |
| 2012/0291028 A1* | 11/2012 | Kidambi ............... H04L 49/602 718/1 |
| 2016/0380916 A1 | 12/2016 | Gnaneswaran et al. |

OTHER PUBLICATIONS

PCT Application No. PCT/US2018/030729, International Search Report and Written Opinion dated Aug. 10, 2018, 14 pages.

* cited by examiner

*Primary Examiner* — Gregory A Kessler

(57) ABSTRACT

The technology disclosed herein enables identification of multi-tiered applications in virtual computing elements. In a particular embodiment, a method provides identifying a plurality of guest elements executing on one or more host computing systems for a virtual computing environment and categorizing each of the plurality of guest elements into a tier group of a plurality of tier groups. The method further provides monitoring communication traffic between the plurality of guest elements and determining a multi-tiered application for each of the plurality of guest elements based on the communication traffic.

20 Claims, 8 Drawing Sheets

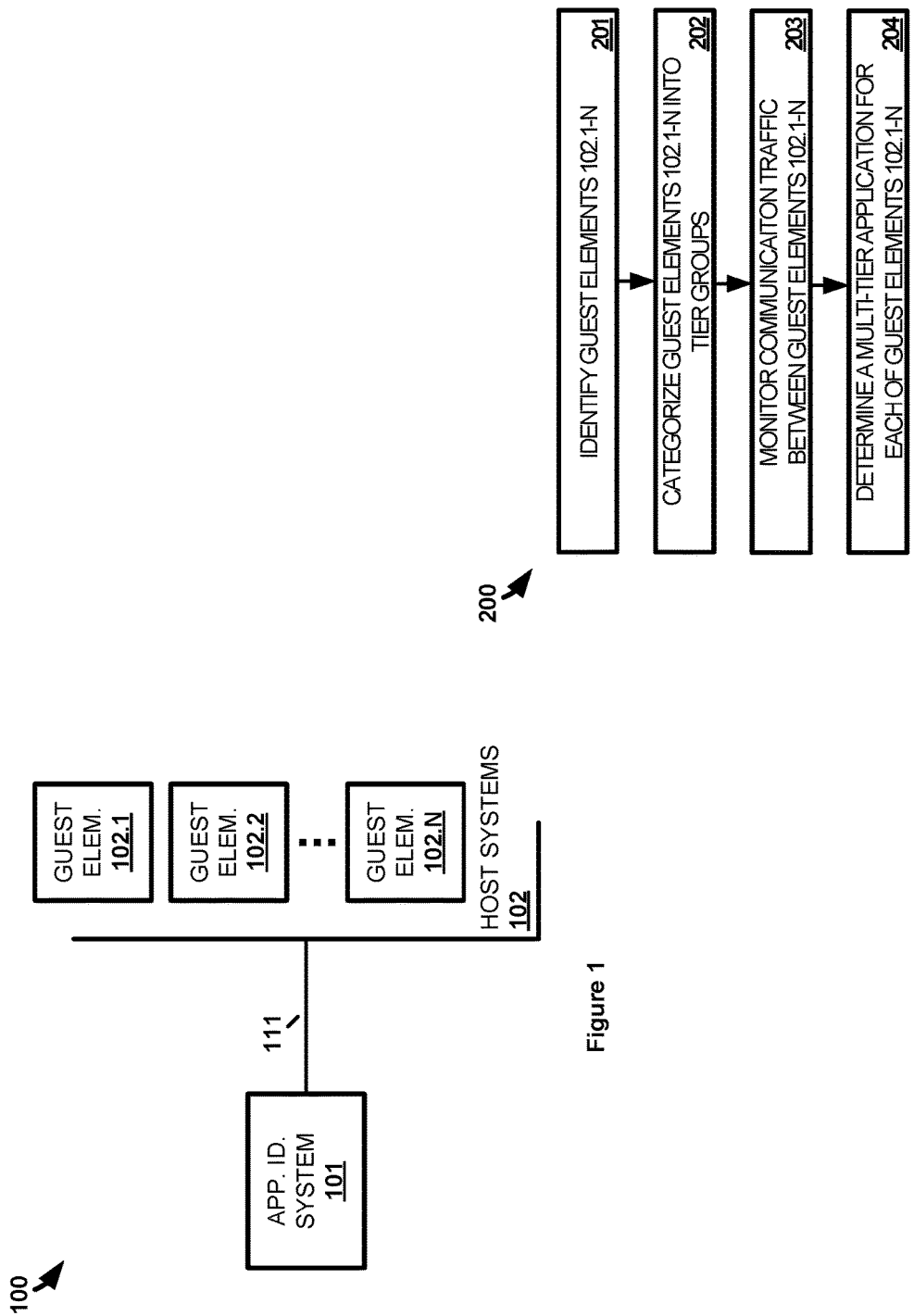

TIERED APPLICATION DISCOVERY

TECHNICAL BACKGROUND

Many applications are implemented with multiple tiers. Each application tier may be executing on a different system whether that system is physical or virtual. In one common example, a web-based application, which clients typically access over the Internet, may be implemented in three tiers: a web server tier, an application server tier, and a database tier. Each of the three tiers perform a specific function to support the provision of the web-based application to the clients. Thus, while applications in each of the three tiers are applications in and of themselves, they work together to form the web-based application.

Especially in situations where many applications are executing in a multi-tiered application environment, it can be difficult to enforce network policies without knowing which individual application processes belong to which multi-tiered applications. For example, two application components may be exchanging communications with one another. If those two applications are part of the same multi-tiered application, then those communications may be proper. However, if those same two applications are not part of the same multi-tiered application, then those communications may not be proper. As such, the determination of whether the communications are proper cannot be made unless the multi-tiered application of each individual application process is first identified.

SUMMARY

The technology disclosed herein enables identification of multi-tiered applications in virtual computing elements. In a particular embodiment, a method provides identifying a plurality of guest elements executing on one or more host computing systems for a virtual computing environment and categorizing each of the plurality of guest elements into a tier group of a plurality of tier groups. The method further provides monitoring communication traffic between the plurality of guest elements and determining a multi-tiered application for each of the plurality of guest elements based on the communication traffic.

In some embodiments, categorizing each of the plurality of guest elements into a tier group of the plurality of tier groups comprises matching each of the plurality of guest elements to an inventory of guest element identifiers maintained by a management element of the virtual computing environment. The guest element identifiers indicate into which of plurality of tier groups each guest element of the plurality of guest elements should be categorized. In those embodiments, matching each of the plurality of guest elements to an inventory of guest element identifiers may comprise matching a process name and a product name for each of the plurality of guest elements to process names and product names maintained by the management element. Also, in those embodiments, matching each of the plurality of guest elements to an inventory of guest element identifiers may comprise matching a hash for each of the plurality of guest elements to hashes maintained by the management element. In some cases, when a match is not found for a hash of a particular guest element in the hashes maintained by the management element, querying a third-party database of hashes to determine the match.

In some embodiments, identifying the plurality of guest elements comprises obtaining identification information from one or more guest operating systems in which each of the plurality of guest elements execute. In those embodiments, obtaining the identification information may comprise retrieving the identification information from an operating system registry or an operating system package manager in each of the one or more guest operating systems. Also, in those embodiments, obtaining the identification information may comprise receiving the identification information from an agent executing within each of the one or more guest operating systems.

In some embodiments, monitoring the communication traffic between the plurality of guest elements comprises identifying at least a source and a destination for each network connection of the communication traffic.

In some embodiments, the multi-tiered application comprises at least one guest element of the plurality of guest elements in each of a web server tier group, an application server tier group, and a database server tier group.

In another embodiment, system is provided having one or more computer readable storage media and a processing system operatively coupled with the one or more computer readable storage media. Program instructions stored on the one or more computer readable storage media, when read and executed by the processing system, direct the processing system to identify a plurality of guest elements executing on one or more host computing systems for a virtual computing environment and categorize each of the plurality of guest elements into a tier group of a plurality of tier groups. The program instructions further direct the processing system to monitor communication traffic between the plurality of guest elements and determine a multi-tiered application for each of the plurality of guest elements based on the communication traffic.

BRIEF DESCRIPTION OF THE DRAWINGS

FIG. 1 illustrates a computing environment for identifying multi-tier applications.

FIG. 2 illustrates a method of operating the computing environment to identify multi-tier applications.

DETAILED DESCRIPTION

Figure 3:
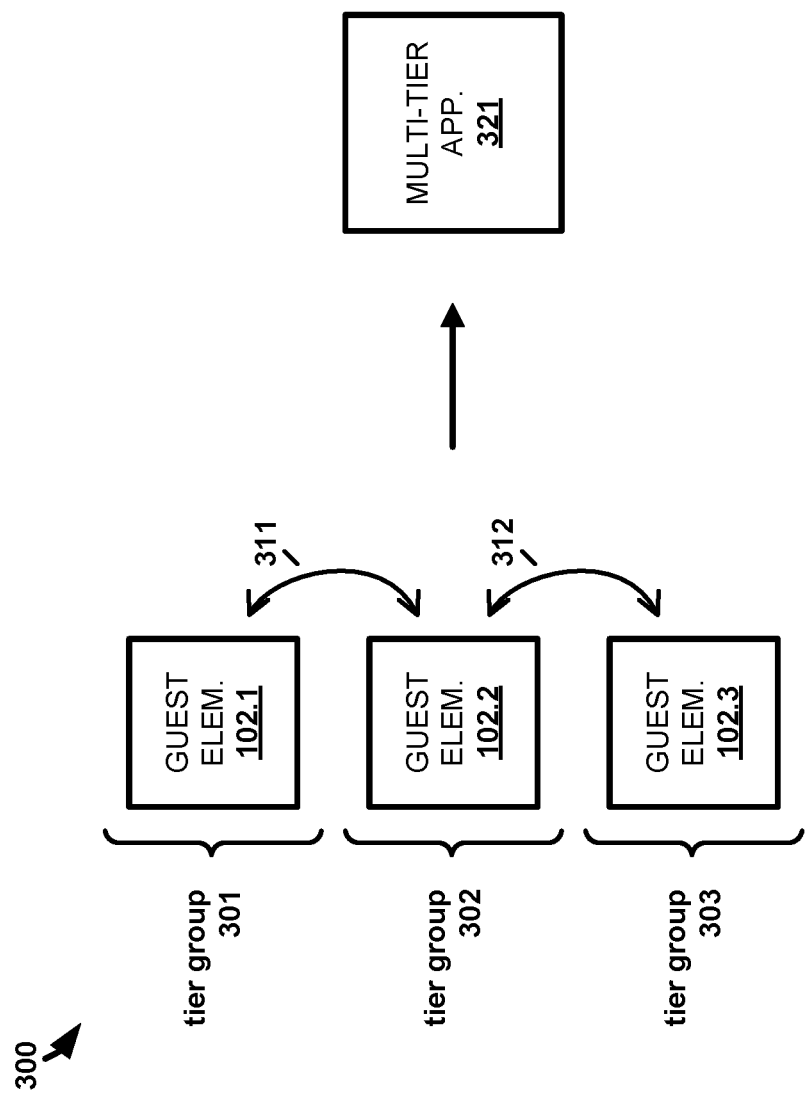
FIG. 3 illustrates an operational scenario of the computing environment to identify multi-tier applications.

The implementations provided herein allow for the discovery of multi-tiered applications from applications executing in a computing environment. The tiers of a multi-tiered application include one or more tier applications executing at each level. Each application component of a multi-tiered application may be implemented through the use of guest computing elements, such as an application executing in a virtual machine, or a containerized application, such as one implemented with Docker® technology available from Docker, Inc. Within a computing environment that is executing the tier application components of one or more multi-tiered applications, each tier application is treated like any other independent application without regard for the multi-tiered application of which any one tier application is a part. As such, administration of the computing environment, such as network policy enforcement, also cannot be performed with respect to whether a particular tier application component is part of a particular multi-tiered application.

FIG. 1 illustrates computing environment 100 for identifying multi-tier applications. Computing environment 100 includes multi-tiered application identification system 101 and host computing systems 102. Host computing systems 102 comprise one or more host computing systems that each host one or more of guest computing elements 102.1-N. Each guest computing element comprises an application executing on a virtual machine, a container, or some other type of virtualized component in which an application may execute on a host computing system. In this example, multi-tiered application identification system 101 and host computing systems 102 exchange communications over communication link(s) 111. However, it should be understood that multi-tiered application identification system 101 could be implemented as a guest computing element similar to guest computing elements 102.1-N. Likewise, host computing systems 102 may be connected over one or more communication links similar to communication link 111.

FIG. 2 illustrates method 200 of operating computing environment 100 to identify multi-tier applications. In particular, method 200 provides a manner in which multi-tiered application identification system 101 identifies one or more multi-tiered applications that are comprised of tier applications executing within guest computing elements 102.1-N. In this example, it is assumed that each guest computing element includes only one tier application but other examples may include more than one such application on a single guest computing element.

Method 200 provides multi-tiered application identification system 101 identifying guest computing elements 102.1-N (201). Multi-tiered application identification system 101 may identify guest computing elements 102.1-N by querying host computing systems 102 for identification information that identifies any guest computing element executing thereon. More specifically, multi-tiered application identification system 101 may request the identification information from a software component executing on each of host computing systems 102. For example, if guest computing element 102.1 is executing within a virtual machine on one of host computing systems 102, then multi-tiered application identification system 101 may request the identification information from a guest operating system of that virtual machine. In those examples, many popular operating systems each include a registry or a package manager that track processes operating thereon. Identification information for guest computing elements 102.1-N would be included in the registry or package manager for retrieval by multi-tiered application identification system 101. In some cases, a software element executes within the guest operating system, and/or within a hypervisor facilitating the guest operating system on the host system, to obtain the identification information and provide the identification information to multi-tiered application identification system 101. The identification information may include a process name, a product name, a derivative of the package name and/or product name (e.g., a hash), or some other type of information that may be used to identify a guest computing element.

From the identification information, method 200 provides multi-tiered application identification system 101 categorizing each of guest computing elements 102.1-N into a tier group (202). A tier group may correspond to a guest computing element's position within a multi-tiered application. For instance, a common multi-tiered application comprises a web server tier having an application that communicates with web clients, an application server tier having an application that provides the underlying application provided by the web server tier, and a database tier that provides an information base used by the application in the application tier. Multi-tiered application identification system 101 categorizes each guest computing element into the tier of a multi-tiered application to which the guest computing element belongs. It should be understood that, while the example above provides three tier groups into which a guest computing element may be categorized (i.e., web server, application server, database server), more or fewer tier groups may exist. Likewise, the tier groups may include application types other than the three mentioned above.

Multi-tiered application identification system 101 may maintain a table or other data structure that provides a correspondence of guest computing element identification information to a particular tier group. In these examples, a tier group for any given guest computing element can be determined by referencing the table with the guest computing element's identification information. In other examples, multi-tiered application identification system 101 may reference one or more other systems, including third party systems, to determine into which tier group a guest computing element should be categorized. For instance, if identification information for a guest computing element is not found in multi-tiered application identification system 101's own table, multi-tiered application identification system 101 will reference another source to identify a tier group for the guest computing element. In some examples, a catchall, or default, tier group may be used for guest computing elements that multi-tiered application identification system 101 is unable to categorize.

Method 200 further provides multi-tiered application identification system 101 monitoring communication traffic between guest computing elements 102.1-N (203). The monitoring of communication traffic need not wait for guest computing elements 102.1-N to be categorized before commencing. In some cases, a communication traffic connection may be the impetus for identifying the guest computing elements involved in that connection. By virtue of their guest nature, host computing systems 102 can monitor communication traffic between guest computing elements 102.1-N and provide the communication traffic information to multi-tiered application identification system 101. In some cases, a software element executing within a hypervisor on each of host computing systems 102 is configured to monitor communication traffic facilitated by the hypervisor on behalf of guest computing elements 102.1-N. This monitoring is possible due to all communication traffic exchanged with guest computing elements 102.1-N having to pass through at least one hypervisor. The resultant communication traffic information may include at least an origin and a destination of communication traffic exchanged with one or more of guest computing elements 102.1-N. The communication traffic information may further include an amount of traffic transferred during each communication traffic connection, a lifetime of each communication traffic connection, information about data being transferred in the communication traffic connection, or some other type of information that may be useful for identifying multi-tiered applications.

Once guest computing elements 102.1-N have been categorized and a sufficient amount of communication traffic has been monitored to allow multi-tiered application identification system 101 to proceed with multi-tiered application identification, method 200 provides multi-tiered application identification system 101 determining a multi-tiered application for each of guest computing elements 102.1-N based on the communication traffic (204). In general, guest computing elements that communicate with one another frequently are likely part of the same multi-tiered application. Moreover, multi-tiered application identification system 101 may reference definition information defining what communication traffic would be indicative of a guest computing element being part of a multi-tiered application along with at least one other guest computing element. For instance, the definition information may indicate that a multi-tiered application of one type must include at least one guest computing element from each of a given set of tier groups and indicate which guest computing elements within that multi-tiered application should be communicating with one another. Using the definition information, multi-tiered application identification system 101 may infer, based on communication traffic, to which distinct multi-tiered application each guest computing element belongs.

Furthermore, the definition information may indicate, based on guest computing element identification information, which guest computing elements would be included in which types of multi-tiered applications. That is, certain guest computing elements may only operate as part of one or more types of multi-tiered applications, thus, further narrowing the possibilities when determining a particular multi-tiered application for each guest computing element. For instance, an email server guest computing element would operate with other guest computing elements that operate to provide an email service multi-tiered application but not with guest computing elements that operate for some other purpose.

In some cases, based on the identification information for each guest computing element in a particular multi-tiered application, multi-tiered application identification system 101 may further identify the multi-tiered application as a whole. For example, a web server application guest element, an email server element, and an email database element, may be identified as a web-based email multi-tiered application by multi-tiered application identification system 101.

Advantageously, instead of guest computing elements 102.1-N being treated as independent applications within computing environment 100, multi-tiered application identification system 101 is able to determine one or more multi-tiered applications implemented using guest computing elements 102.1-N. Computing environment 100 can then be operated and managed with respect to guest computing elements 102.1-N based on their multi-tiered applications rather than simply on an individual basis.

FIG. 3 illustrates an operational scenario 300 of computing environment 100 to identify multi-tier applications. Scenario 300 is an example of how a multi-tiered application is identified in accordance with method 200 discussed above. In particular, multi-tiered application identification system 101 categorized guest computing element 102.1 into tier group 301, guest computing element 102.2 into tier group 302, and guest computing element 102.3 into tier group 303. As previously noted, while this example includes only three tier groups any number of tier groups may be used depending on how many tiers a multi-tiered application in computing environment 100 may have. Furthermore, multi-tiered application identification system 101 identifies communication traffic 311 being exchanged between guest computing element 102.1 and guest computing element 102.2 and identifies communication traffic 312 being exchanged between guest computing element 102.2 and guest computing element 102.3. Although communication traffic 311 and 312 are indicated as being bidirectional, it should be understood that multi-tiered application identification system 101 may also consider the directional nature of communication traffic (e.g., traffic to a guest computing element with no return traffic may be ignored as an outlier in some cases).

In scenario 300, communication traffic 311 and 312 is enough for multi-tiered application identification system 101 to determine that guest computing elements 102.1-3 are included in a multi-tiered application, specifically, multi-tiered application 321. Multi-tiered application identification system 101 may have used definition information when making the determination. For example, definition information may indicate that communications between three guest computing elements in tier groups 301-303, like that shown for communication traffic 311 and 312, belong to guest computing elements in a multi-tiered application. Once multi-tiered application 321 has been identified guest computing elements 102.1-3 can be treated as components of multi-tiered application 321 rather than on a completely independent basis.

Figure 4:
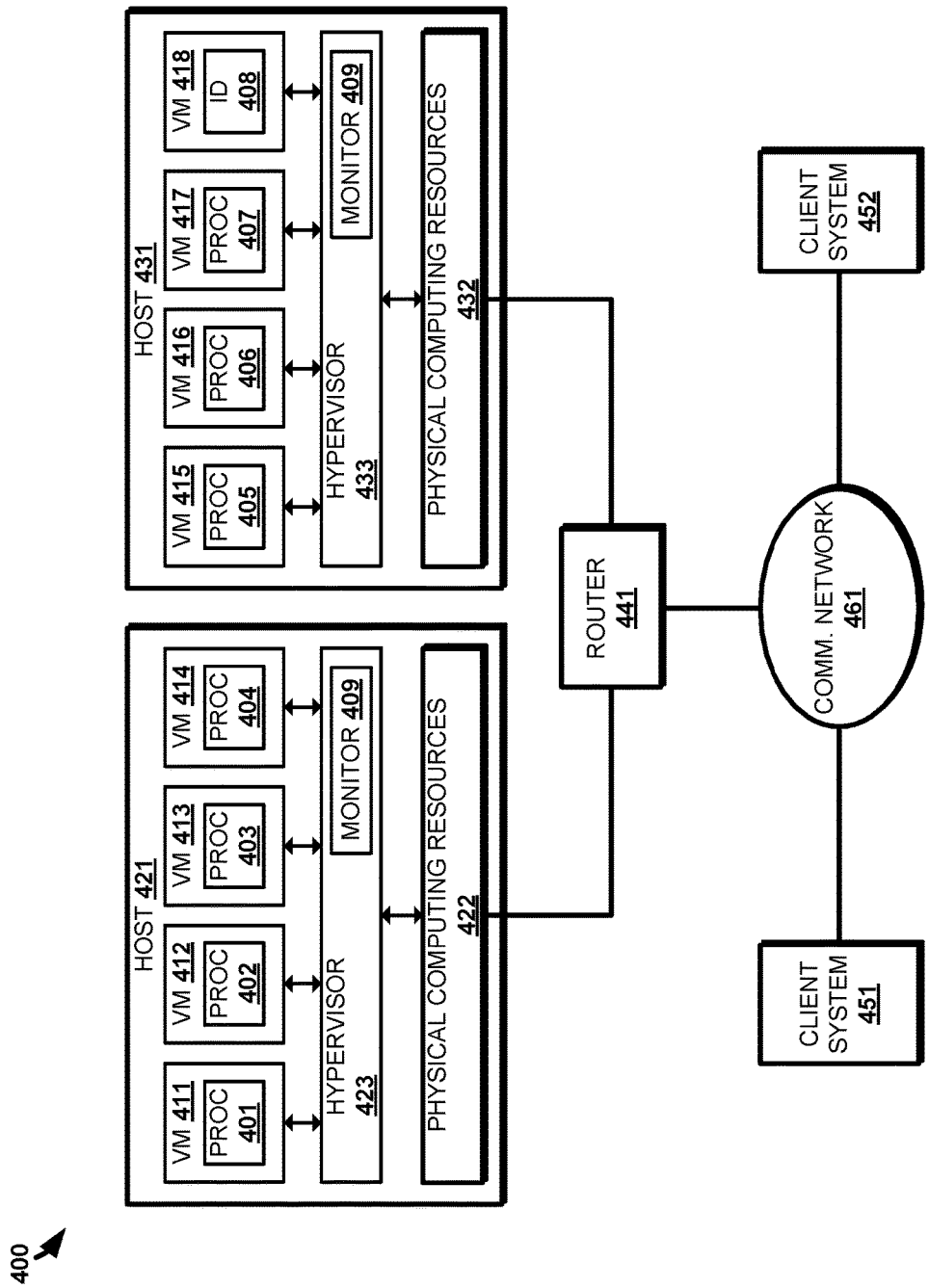
FIG. 4 illustrates another computing environment for identifying multi-tier applications.

FIG. 4 illustrates computing environment 400 for identifying multi-tier applications. Computing environment 400 includes host computing system 421, host computing system 431, communications router 441, communication network 461, client system 451, and client system 452. In this example, communications router 441 comprises a layer 3 (network layer) router in the Open Systems Interconnection model (OSI model) that routes communications to/from and between host computing systems 421 and 431. Communication router 441 is further configured to exchange communications with other systems and devices over communication network 461. Communication network 461 may include the Internet, one or more local area networks, and/or one or more wide area networks. While shown separately, communication router 441 may be considered part of communication network 461 in some examples. Client system 451 and client system 452 are able to communicate with host computing systems 421 and 431 via communication network 461 and communication router 441.

In this example, host computing system 421 executes hypervisor 423 to allocate physical computing resources 422 among virtual machines 411-414. Likewise, host computing system 431 executes hypervisor 433 to allocate physical computing resources 432 among virtual machines 415-418. Physical computing resources 422 and 432 may include processing resources (e.g., CPU time/cores), memory space, network interfaces, user interfaces, or any other type of resource that a physical computing system may include. Each of virtual machines 411-418 include guest processes 401-408 executing therein. Guest process 408, in particular, is an application that implements a multi-tiered application identification system on virtual machine 418. Hypervisors 423 and 433 further implement communication traffic monitor 409.

It should be understood that the distribution of virtual machines evenly across two host computing systems, as shown in FIG. 4, is merely exemplary. The eight virtual machines shown may instead be implemented on any number of host computing systems from one to eight. Likewise, host computing systems 321 and 331 could host additional hosts and virtual machines and/or other virtual elements that are not involved in this example.

Figure 5:
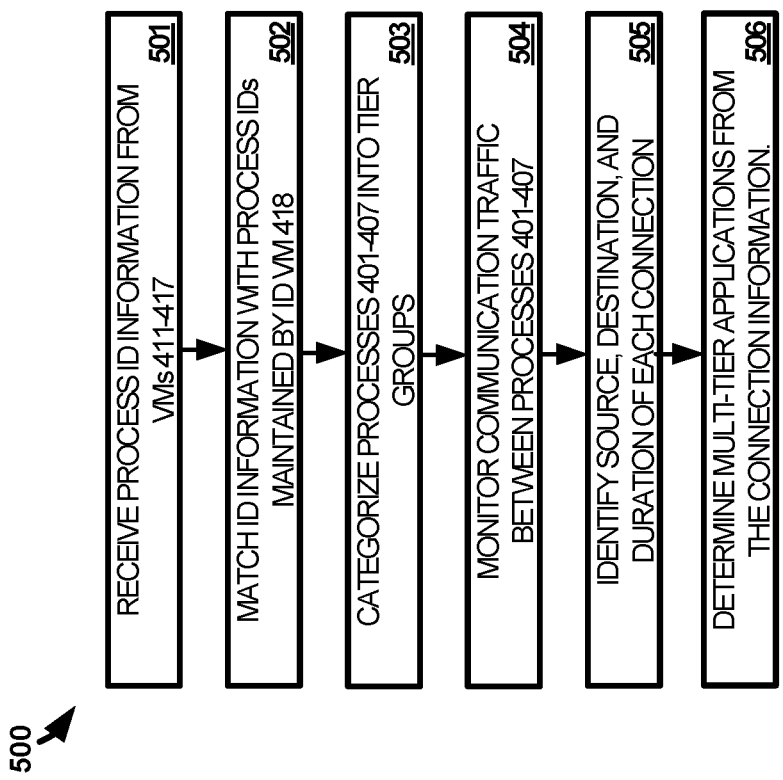
FIG. 5 illustrates a method of operating the other computing environment to identify multi-tier applications.

FIG. 5 illustrates method 500 of operating computing environment 400 to identify multi-tier applications. Virtual machines 411-417 have respective guest processes 401-407 running thereon. Multi-tiered application identification virtual machine 418 has identification process 408 executing thereon in an example of how multi-tiered application identification system 101 could be implemented as a guest element. While each virtual machine 411-418 is shown to only have one guest process running thereon, it is possible for more than one process to be running on any given virtual machine.

Method 500 provides multi-tiered application identification virtual machine 418 receiving process identification information from each of virtual machines 411-417 (501). In particular, software agents executing within the respective operating systems of virtual machines 411-417 determine which guest processes 401-407 are executing on each of virtual machines 411-417. If an operating system is a Microsoft Windows® based operating system, then the agent reads from the registry of the operating systems for identification information identifying running processes. If an operating system is a Linux® based operating system, then the agent reads from the package manager for identification information identifying running processes. Other operating systems may have alternative elements from where the agents obtain process identification information. The process identification information may include any type of information that may be useful for identifying a process, such as an executable file name for the process or a hash of the process' binary. The process identification information may be transferred upon request to the agent from multi-tiered application identification virtual machine 418, may be transferred automatically when a new process starts, or may be transferred on some other schedule. In some cases, the agents may be configured to transfer process identification information for only certain processes (i.e., those processes that may have potential to be a component of a multi-tiered application) or may transfer process identification information less discriminatorily and allow multi-tiered application identification virtual machine 418 determine the information's relevance.

Method 500 further provides multi-tiered application identification virtual machine 418 matching process identification information with process identification information in a database maintained by multi-tiered application identification virtual machine 418 (502). The database may be stored within multi-tiered application identification virtual machine 418 or may be maintained in a database external to multi-tiered application identification virtual machine 418. The database includes more detailed information about processes associated with identification information stored therein. As such, when process identification information retrieved from an agent matches process identification information in the database, multi-tiered application identification virtual machine 418 can obtain more detailed information about that process from the database. The more detailed information may include a file path for the process, a type of process (e.g., web server), a product version identifier for the process, an identifier for a company that released the process, or some other type of information that may be useful for determining in which tier of a multi-tiered application the process belongs. In this example, multi-tiered application identification virtual machine 418 determines more detailed information about guest processes 401-407 identified by matching their respective process identification information in the database.

From the more detailed information discovered above, method 500 provides multi-tiered application identification virtual machine 418 categorizing guest processes 401-407 into tier groups (503). Depending on the number of tiers in a multi-tiered application the number of tier groups may include any number of two or more tier groups. In some cases, one or more tier groups for tiers of one multi-tiered application may be different than for another application. The more detailed information about each of guest processes 401-407 indicates to multi-tiered application identification virtual machine 418 which of the tier groups that process should be included. For example, the more detailed information about guest process 403 may indicate that guest process 403 is a web server application. As such, multi-tiered application identification virtual machine 418 categorizes guest process 403 into a web server tier group.

Additionally, method 500 provides multi-tiered application identification virtual machine 418 communicates with communication traffic monitor 409 to monitor communication traffic exchanged between and with guest processes 401-407 (504). An instance of communication traffic monitor 409 is running in both hypervisors 423 and 433 so that all communications with virtual machines 411-417 can be captured. Thus, whenever a communication connection is made to or from one of virtual machines 411-417 communication traffic monitor 409 is able to determine, possibly by interfacing with the agent in each respective virtual machine 411-417, whether that communication connection is for one of guest processes 401-407. If the communication connection is for one of guest processes 401-407, communication traffic monitor 409 is able to gather information about that connection, such as the source of the communication traffic, the destination for the communication traffic, the duration of the communication connection for the traffic, or any other communication traffic characteristics (505).

Based on the tier grouping for each of guest processes 401-407 and the communication traffic characteristics determined by communication traffic monitor 409, method 500 provides multi-tiered application identification virtual machine 418 determining one or more multi-tiered applications for each of guest processes 401-407 (506). Multi-tiered application identification virtual machine 418 may use multi-tiered application definitions to determine whether a guest process is part of one multi-tiered application or another. While communication traffic between two guest processes generally indicates that those two guest processes are part of the same multi-tiered application, more specific multi-tiered application definitions may be used. For example, a definition may provide that a minimum duration of a communication connection between guest processes in two tier groups is necessary for those two processes to be in the same multi-tiered application.

Figure 6:
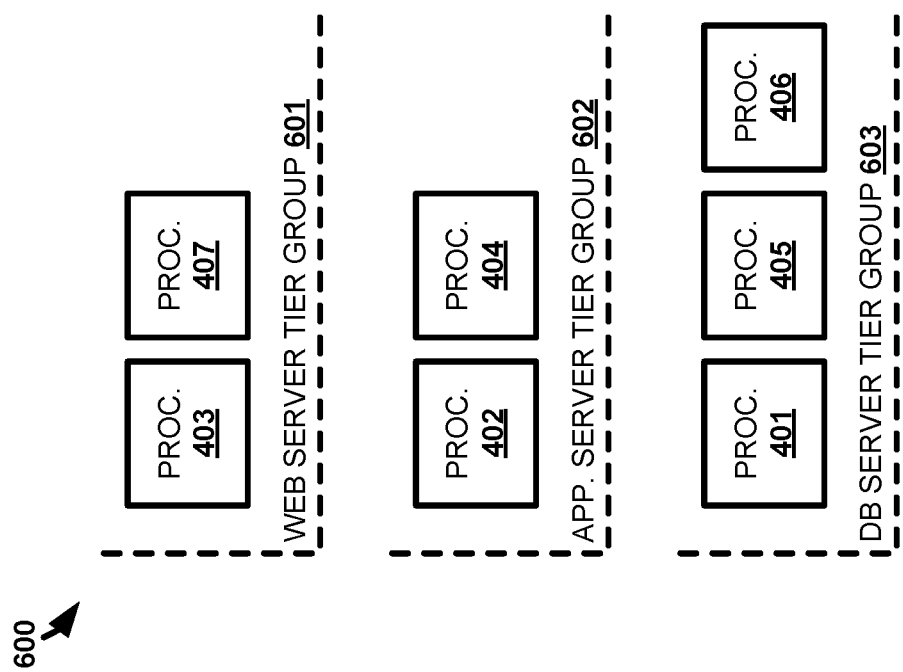
FIG. 6 illustrates an operational scenario of the other computing environment to identify multi-tier applications according to one implementation.

FIG. 6 illustrates an operational scenario 600 of computing environment 400 to identify multi-tier applications according to one implementation. The example of scenario 600, and subsequent scenarios 700 and 800 described below, illustrates how guest processes 401-407 are categorized and eventually sorted into multi-tiered applications. For clarity, all multi-tiered applications in this example have three tiers. In particular, the multi-tiered applications are applications that provide a web-based service and include a web server tier, an application server tier, and a database server tier. As such, multi-tiered application identification virtual machine 418 categorizes guest processes 401-407 into web server tier group 601, application server tier group 602, and database server tier group 603.

In this case, the identification information obtained for guest processes 403 and 407, and the subsequent more detailed information identified based on that identification information, leads multi-tiered application identification virtual machine 418 to determine that guest processes 403 and 407 comprise web server applications. Multi-tiered application identification virtual machine 418 therefore categorizes guest processes 403 and 407 into web server tier group 601. Similarly, guest processes 402 and 404 are categorized into application server tier group 602 and guest processes 401, 405, and 406 are categorized into database server tier group 603.

Figure 7:
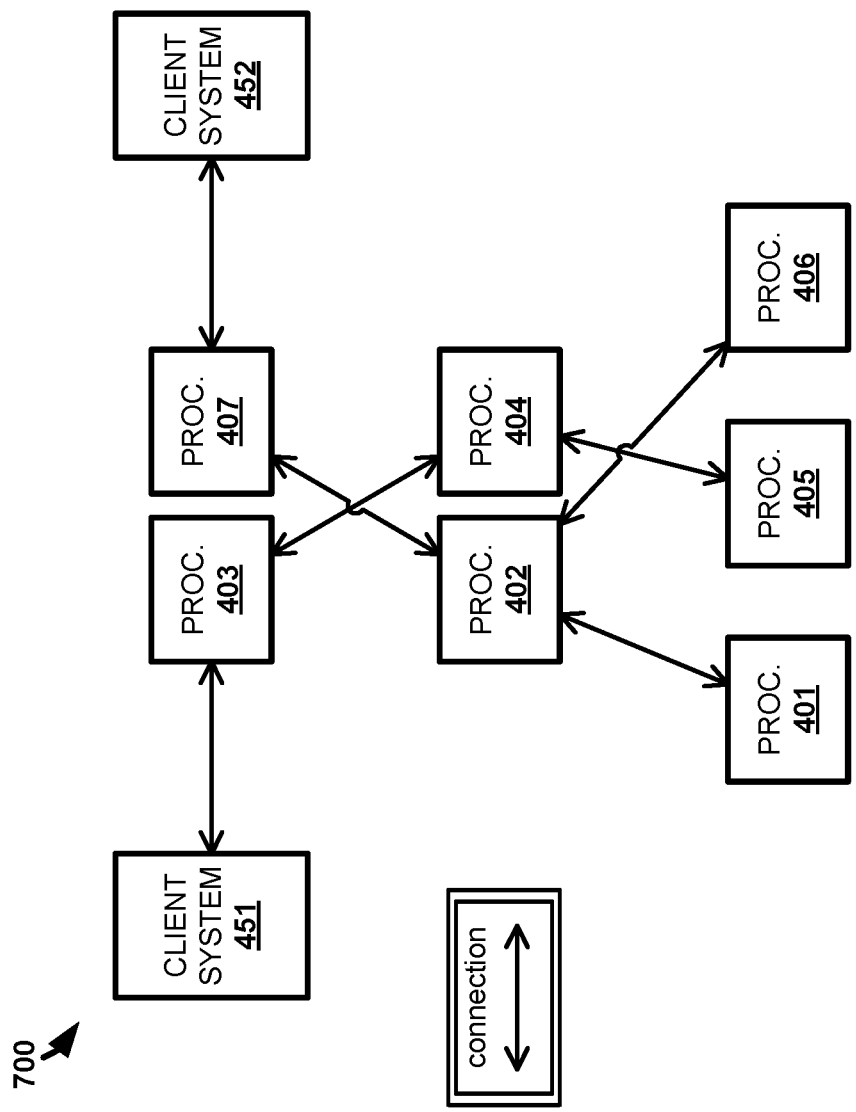
FIG. 7 illustrates a continuation of the operational scenario of the other computing environment to identify multi-tier applications according to one implementation.

FIG. 7 illustrates operational scenario 700 in a continuation of operational scenario 600 to identify multi-tier applications according to one implementation. In scenario 700, multi-tiered application identification virtual machine 418 uses communication traffic monitor 409 to identify communication traffic between guest processes 401-407. Each arrowed line in scenario 700 indicates that at least one communication traffic connect was identified. For instance, multi-tiered application identification virtual machine 418 determines that communication traffic was exchanged between guest process 404 and guest process 403. Additionally, guest processes 403 and 407 are found to exchange communication traffic with client systems 451 and 452, respectively, as would be expected of guest processes placed in web server tier 601. It should be understood that, while the connections are shown to be bidirectional, the direction of the communication traffic may be relevant in some examples.

Figure 8:
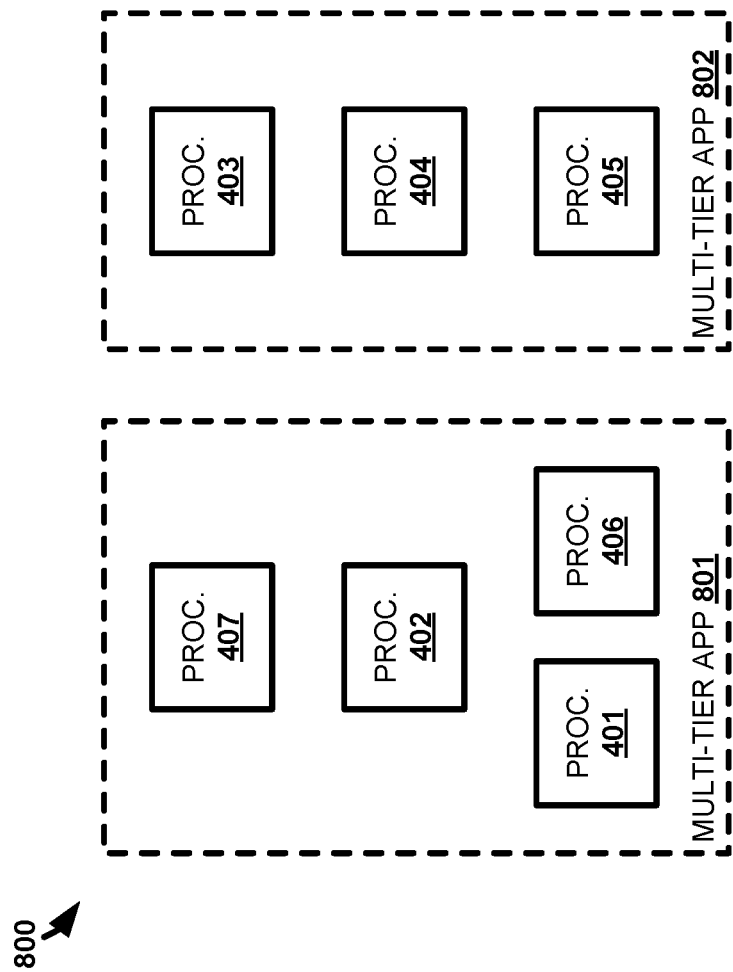
FIG. 8 illustrates another continuation of the operational scenario of the other computing environment to identify multi-tier applications according to one implementation.

FIG. 8 illustrates operational scenario 800 in a continuation of operational scenario 700 to identify multi-tier applications according to one implementation. Based on the communication traffic connections identified in scenario 700, multi-tiered application identification virtual machine 418 determines that guest processes 401, 402, 406 and 406 are part of one multi-tiered application 801 while guest processes 403-405 are part of another multi-tiered application 802. In this example, the guest processes were distinguished because none of the guest processes in multi-tiered application 801 exchanged communications with any of the guest processes in multi-tiered application 802. Also, multi-tiered application 801 shows that it is possible for a single multi-tiered application to include more than one guest process in the same tier group (i.e., guest processes 401 and 406 in database server tier group 603).

Once guest processes 401-407 have been discovered to be parts of multi-tiered applications 801 and 802, guest processes 401-407 may be managed based on their inclusion within multi-tiered applications 801 and 802. For example, rules governing how guest processes communicate in computing environment 400 may allow for guest processes 402 and 404 to exchange communications. However, rules that are further based on multi-tiered applications may prevent communication exchanges between multi-tiered applications 801 and 802. Thus, knowledge that guest processes 402 and 404 are in multi-tiered applications 801 and 802 allows for communications there between to be blocked. Of course, any number of other possibilities for managing guest processes based on their inclusion in one or more multi-tiered applications also exist.

Figure 9:
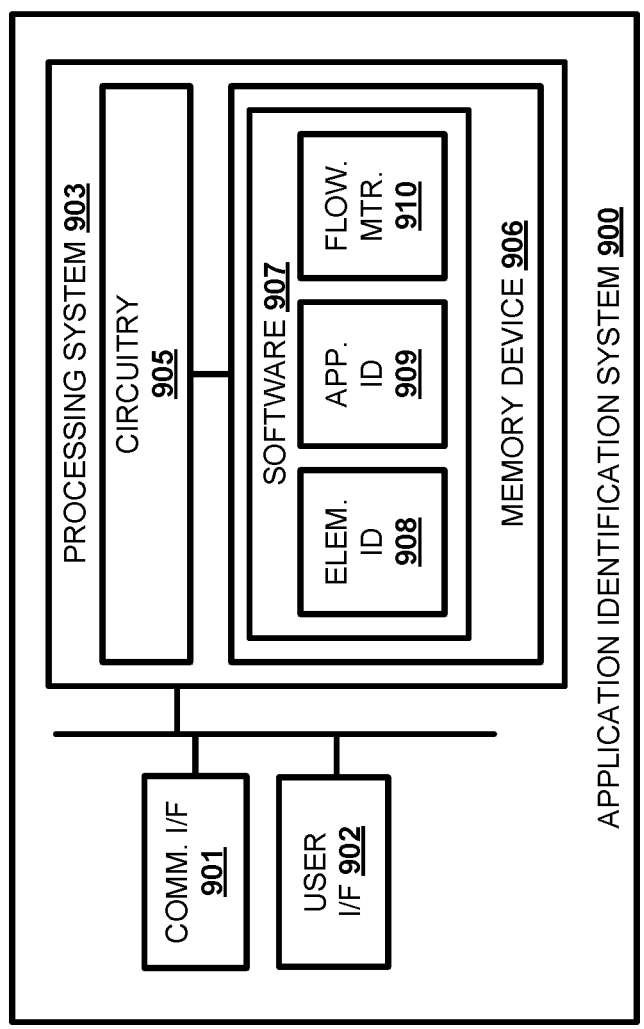
FIG. 9 illustrates a computing architecture used to identify multi-tier applications according to one implementation.

FIG. 9 illustrates a computing system 900 to identify multi-tier applications according to one implementation. Computing system 900 is representative of any computing system or systems with which the various operational architectures, processes, scenarios, and sequences disclosed herein identify multi-tier applications according to one implementation. Computing system 900 is an example of a computing system for implementing multi-tiered application identification system 101, host computing system 421, or host computing system 431, although other examples may exist. Computing system 900 comprises communication interface 901, user interface 902, and processing system 903. Processing system 903 is linked to communication interface 901 and user interface 902. Processing system 903 includes processing circuitry 905 and memory device 906 that stores operating software 907. Computing system 900 may include other well-known components such as a battery and enclosure that are not shown for clarity.

Communication interface 901 comprises components that communicate over communication links, such as network cards, ports, radio frequency (RF), processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 may include volatile and nonvolatile, removable and non-removable media implemented in any method or technology for storage of information, such as computer readable instructions, data structures, program modules, or other data. Memory device 906 may be implemented as a single storage device, but may also be implemented across multiple storage devices or sub-systems. Memory device 906 may comprise additional elements, such as a controller to read operating software 907. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes guest element identification module 908, multi-tiered application identification module 909, and traffic flow monitor 910, although any number of software modules within the application may provide the same operation. Operating software 907 may further include an operating system, utilities, drivers, network interfaces, applications, or some other type of software. When executed by processing circuitry 905, operating software 907 directs processing system 903 to operate computing system 900 as described herein.

In a particular example, guest element identification module 908 directs processing system 903 to identify a plurality of guest elements executing on one or more host computing systems for a virtual computing environment. Multi-tiered application identification module 909 directs processing system 903 to categorize each of the plurality of guest elements into a tier group of a plurality of tier groups. Traffic flow module 910 directs processing system 903 to monitor communication traffic between the plurality of guest elements. Multi-tiered application identification module 909 further directs processing system 903 to determine a multi-tiered application for each of the plurality of guest elements based on the communication traffic.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of identifying multi-tiered applications, the method comprising:
   identifying a plurality of guest elements executing on one or more host computing systems for a virtual computing environment;
   categorizing each of the plurality of guest elements into a tier group of a plurality of tier groups, wherein categorizing comprises matching each of the plurality of guest elements to an inventory of guest element identifiers maintained by a management element of the virtual computing environment, wherein the guest element identifiers indicate into which of plurality of tier groups each guest element of the plurality of guest elements should be categorized;
   monitoring communication traffic between the plurality of guest elements; and
   determining a multi-tiered application for each of the plurality of guest elements based on the communication traffic.

2. The method of claim 1, wherein determining the multi-tiered application for each of the plurality of guest elements is further based on the tier group of each respective guest element of the plurality of guest elements.

3. The method of claim 1, wherein matching each of the plurality of guest elements to an inventory of guest element identifiers comprises:
   matching a process name and a product name for each of the plurality of guest elements to process names and product names maintained by the management element.

4. The method of claim 1, wherein matching each of the plurality of guest elements to an inventory of guest element identifiers comprises:
   matching a hash for each of the plurality of guest elements to hashes maintained by the management element.

5. The method of claim 4, wherein matching each of the plurality of guest elements to an inventory of guest element identifiers further comprises:
   when a match is not found for a hash of a particular guest element in the hashes maintained by the management element, querying a third-party database of hashes to determine the match.

6. The method of claim 1, wherein identifying the plurality of guest elements comprises:
   obtaining identification information from one or more guest operating systems in which each of the plurality of guest elements execute.

7. The method of claim 6, wherein obtaining the identification information comprises:
   retrieving the identification information from an operating system registry or an operating system package manager in each of the one or more guest operating systems.

8. The method of claim 6, wherein obtaining the identification information comprises:
   receiving the identification information from an agent executing within each of the one or more guest operating systems.

9. The method of claim 1, wherein monitoring the communication traffic between the plurality of guest elements comprises:
   identifying at least a source and a destination for each network connection of the communication traffic.

10. The method of claim 1, wherein the multi-tiered application comprises at least one guest element of the plurality of guest elements in each of a web server tier group, an application server tier group, and a database server tier group.

11. A system for identifying multi-tiered applications, the system comprising:
    one or more computer-readable storage media;
    a processing system operatively coupled with the one or more computer readable storage media; and
    program instructions stored on the one or more computer readable storage media that, when read and executed by the processing system, direct the processing system to:
       identify a plurality of guest elements executing on one or more host computing systems for a virtual computing environment;
       categorize each of the plurality of guest elements into a tier group of a plurality of tier groups, wherein to categorize each of the plurality of guest elements, the program instructions direct the processing system to match each of the plurality of guest elements to an inventory of guest element identifiers maintained by a management element of the virtual computing environment, wherein the guest element identifiers indicate into which of plurality of tier groups each guest element of the plurality of guest elements should be categorized;
       monitor communication traffic between the plurality of guest elements; and
       determine a multi-tiered application for each of the plurality of guest elements based on the communication traffic.

12. The system of claim 11, wherein the program instructions further direct the processing system to:
    determine the multi-tiered application for each of the plurality of guest elements further based on the tier group of each respective guest element of the plurality of guest elements.

13. The system of claim 11, wherein to match each of the plurality of guest elements to an inventory of guest element identifiers, the program instructions direct the processing system to at least:

match a process name and a product name for each of the plurality of guest elements to process names and product names maintained by the management element.

14. The system of claim 11, wherein to match each of the plurality of guest elements to an inventory of guest element identifiers, the program instructions direct the processing system to at least:

match a hash for each of the plurality of guest elements to hashes maintained by the management element.

15. The system of claim 14, wherein to match each of the plurality of guest elements to an inventory of guest element identifiers, the program instructions further direct the processing system to at least:

query a third-party database of hashes to determine the match when a match is not found for a hash of a particular guest element in the hashes maintained by the management element.

16. The system of claim 11, wherein to identify the plurality of guest elements, the program instructions direct the processing system to at least:

obtain identification information from one or more guest operating systems in which each of the plurality of guest elements execute.

17. The system of claim 16, wherein to obtain the identification information, the program instructions direct the processing system to at least:

retrieve the identification information from an operating system registry or an operating system package manager in each of the one or more guest operating systems.

18. The system of claim 16, wherein to obtain the identification information, the program instructions direct the processing system to at least:

receive the identification information from an agent executing within each of the one or more guest operating systems.

19. The system of claim 11, wherein to monitor the communication traffic between the plurality of guest elements, the program instructions direct the processing system to at least:

identify at least a source and a destination for each network connection of the communication traffic.

20. The system of claim 11, wherein the multi-tiered application comprises at least one guest element of the plurality of guest elements in each of a web server tier group, an application server tier group, and a database server tier group.

* * * * *